Patented Apr. 13, 1943

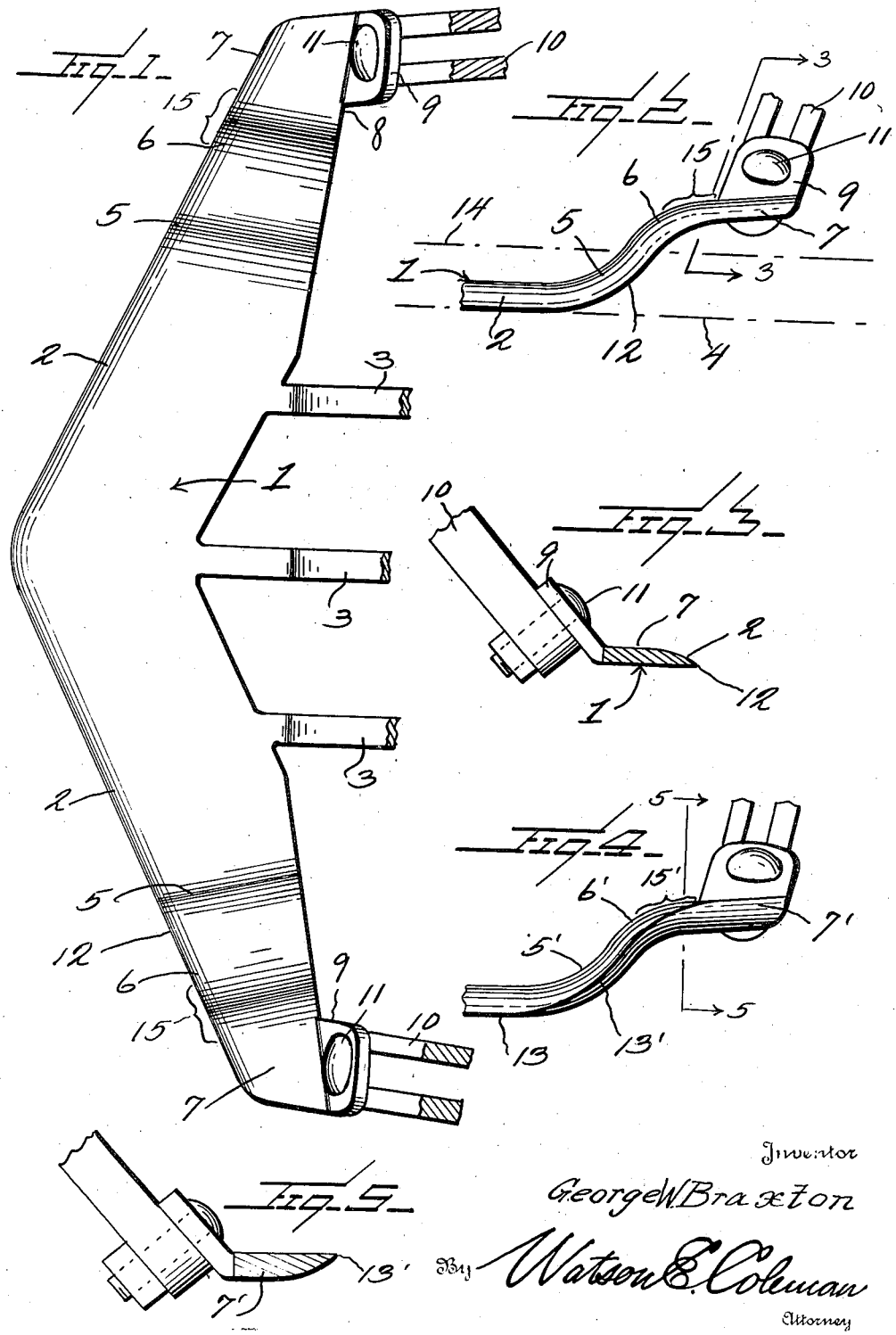

2,316,501

UNITED STATES PATENT OFFICE 2,316,501

PEANUT AND SIMILAR HARVESTING PLOW

George Washington Braxton,
Scotland Neck, N. C.

Application March 16, 1942, Serial No. 434,949

4 Claims. (Cl. 55—54)

This invention relates generally to the class of plows and pertains particularly to an improved peanut harvesting plow.

In the harvesting of peanuts and other types of crops in which the desirable portions grow in the ground there is employed a relatively wide flat plow blade which runs beneath the surface of the ground and which usually has at each end an upturned or upstanding portion to which is attached a shank which couples the plow with the walking or riding cultivator or tractor.

The peanuts or other crops are customarily planted and grow in built up rows or hills and when such hills are standing or remain more or less as originally formed at the time of harvesting the crop no particular difficulty is encountered in running the plow blade through the ground even though there might be some growth of grass or weeds between the hills. However, if such grass or weed growth is excessive or, as more commonly occurs, if due to excessive rainfall the hills have been leveled and grass or weeds have developed in and between the rows of the crops it is very difficult and sometimes practically impossible to plow up the rows of crops due to the fact that the grass and weeds continually pile up and pack against the ends of the plow and around the shank by which the plow ends are connected with the cultivator machine so that the plow will not remain in the ground. Also this work is made extremely difficult if after the leveling of the rows the ground becomes dry and hard as the drag upon the upturned ends of the plow makes it particularly difficult in keeping the plow beneath the surface.

The present invention has for its principal object to provide a peanut harvesting plow or a flat blade type of plow such as is commonly employed for harvesting peanuts, in which the remote ends of the blade are of a novel design whereby the accumulation of grass and weeds around the ends of the blade and around the supporting shanks is positively prevented with the result that the present type of plow can be used to harvest crops in ground in which the rows have been leveled and in which there is a dense growth of grass and weeds and the plow will remain at the proper depth in the ground and the grass and weeds will be cut-off to pass over the ends of the plow adjacent the shanks without piling up against or twisting around the shanks and the ears or other means employed for attaching them to the plow.

Another and more specific object of the invention is to provide a peanut plow blade having at each of its remote ends an upward and lateral curvature or a form in the nature of an ogee curve extending transversely to the line of movement of the plow, the advancing edge of the blade through this curved portion being sharpened whereby the grass and weeds as they ride first along the upwardly and outwardly inclined portion of the blade will drag or be drawn under a curved edge before reaching that portion to which the supporting shank is attached and will be cut-off and will pass over the top of the blade past the shank and the shank attaching ear.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Figure 1 is a view in top plan of a plow blade constructed in accordance with the present invention.

Figure 2 is a detailed view in elevation of one end of the blade looking at the same from the front, wherein the cutting edge follows the plane of the bottom surface of the blade entirely to the end.

Figure 3 is a section on the line 3—3 of Figure 2.

Figure 4 is a detail view illustrating a modification of the cutting edge contour of the blade through the double curved end portion thereof.

Figure 5 is a sectional view taken on the line 5—5 of Figure 4.

Referring now more particularly to the drawing the numeral 1 generally designates the plow blade of the present invention. This blade is formed throughout of suitable steel and in one piece, as shown, and it has a cutting edge 2 which when viewed in top plan is in the form of a wide V the point or nose of which is at the transverse center of the blade as shown and the two portions of the edge sloping outwardly and rearwardly to the two ends of the blade body. The rear edge of the blade may be of any desired form and preferably at the central part of the rear edge there are provided the upwardly and rearwardly extending resilient vine lifting prongs 3 which assist in shaking the soil from the plant roots as they pass over the top of the blade.

Each of the outer end portions of the blade body is curved upwardly and outwardly from the plane of the bottom of the major portion of the blade body which bottom plane is indicated by the reference character 4. The first part or beginning of the curvature is upwardly from the plane line 4 and laterally away from the longitudinal center of the blade forming the first or lower curved part 5 and this part merges with the second or upper curved portion which continues upwardly from the plane line 4 and laterally or outwardly from the longitudinal center or line of travel of the blade as indicated at 6. This upper and convexly curved portion merges at its upper and outer end with a short straight terminal portion 7 which may be horizontal but is preferably slightly inclined upwardly toward its outer end.

Formed integrally with the back edge 8 of the portion 7 is an upwardly extending and rearwardly inclined ear 9 which is designed to have attached to the rear side thereof a supporting shank, a portion of which is illustrated and indicated generally by the numeral 10. A suitable aperture, not shown, is formed through the ear 9 for the reception of a bolt 11, by means of which the end of the blade is secured to the supporting shank, the latter being in turn attached through the medium of any suitable type of trip coupling, not shown, with the overlying frame of a cultivator machine or a frame body which may be attached to a tractor.

A single bolt only is employed at each end of the blade for attaching the same with the supporting shank 10 whereby certain turning movement of the end of the blade with respect to the shank is permitted without danger of breaking the plow blade or damaging other parts of the machine. Such damage has been found to occur where two bolts are used for the reason that the stated slight turning action of the end of the blade with respect to the supporting shank is prevented and consequently when a twisting strain occurs which would be relieved by the pivotal action of a single securing bolt, a broken ear or blade results.

As is shown in Figure 3 the forward edge of the blade is sharpened so that the cutting edge 12 is substantially in the plane of the bottom face of the blade body and in the form shown in Figures 1 to 3 this cutting edge continues in the plane of the under face of the blade body throughout the curved portions 5 and 6 and the terminal portion 7 at each end of the plow.

Figures 4 and 5 illustrate a slight modification wherein the cutting edge which is indicated by the numeral 13 extends in the plane of the bottom face of the blade through that portion which is lowermost in the plow structure or, in other words, that portion which is in the same plane as is indicated by the line 4 in Figure 2 but at the beginning of the curvature of the lower curved portion which is here indicated by the reference character 5', the cutting edge curves upwardly at a sharper curve than the portion 5', as is indicated at 13', and extends across the convex upper curved portion 6' to the top of the terminal portion 7', so as to lie in the plane of the top surface of this portion.

In the use of the present plow the part of the blade lying between the opposite curved portions 5, is introduced into the ground to travel at a fixed depth beneath the surface and preferably such depth will bring the surface of the earth approximately in the plane designated by the broken line 14. Thus it will be seen that at least one-half of the double curved end of the plow will lie above the surface of the ground while the upwardly curving or concave portion 5 projects through the surface thereby cutting a straight line where this portion emerges from the earth.

When the plow is used in earth in which a considerable amount of grass or other vegetation is growing, such vegetation will tend to work toward the ends of the plow. In some types of plows where the ends extend straight upwardly and outwardly to the attaching shanks the vegetation continues to follow this straight upwardly and outwardly inclining edge and finally comes to rest against the front of the shank about which it twists, finally piling up to such an extent as to interfere with the proper operation of the blade. With the present structure, however, as the vegetation rides against the convexly arched edge of the blade in the portion 6 and in the portion flowing into the straight edge of the portion 7 it is drawn under and across the cutting edge and sheered off, the cut portion of the grass or vegetation passing over the top of the plow body across the area generally spanned by the bracket 15, the stubble sliding along underneath of this area. Consequently, the grass is cleanly cut-off before it slides laterally along the cutting edge as far as the attaching ear 9 and it passes over the plow blade and does not pile up against or become entangled around the attaching ear or the supporting shank which is connected with the ear.

The same action occurs in connection with the structure shown in Figure 4 wherein the cut grass passes over the top of the plow blade through the area approximately designated by the bracket 15'.

From the foregoing it will be readily apparent that the plow blade herein disclosed is of such construction that it may be readily and economically produced and it has many desirable advantages over the many different types of peanut harvesting plows heretofore produced in the fact that all prior plows have the very great disadvantage that their construction is such that they cannot be conveniently used in ground which is thickly overgrown with vegetation or in ground in which the hills or rows of the crop have been leveled and may have grass or weeds growing therein.

What is claimed is:

1. A plow comprising a relatively long blade body, said body having a long central flat portion designed to work beneath the ground surface, said central portion being joined at each end with an outwardly extending terminal portion by a doubly bent portion leading upwardly and outwardly in the direction of the length of the blade, the body having a sharpened lead edge extending along the doubly bent portions and to the end of each terminal portion, and means for attaching each terminal portion with a supporting carrier.

2. A plow comprising a relatively long blade having a sharpened lead edge of substantially V form, said blade having a major central flat portion designed to work beneath the ground surface, the blade having a terminal portion at each end spaced vertically from the plane of the central portion to maintain a position above and spaced from the ground surface when the central portion is in working position beneath the surface, said terminal portions being joined with the central portion by intermediate portions which are constructed and arranged to effect the turning over and cutting of vegetation sliding along said sharpened edge before such vegetation reaches the free ends of the terminal portions, and means for attaching said terminal portions at their free ends with a supporting carrier.

3. A plow as set forth in claim 2 wherein said intermediate portions each consists of a concave upwardly curving part leading from the central portion and a convex upwardly and outwardly curving part leading from the upper end of the concave part into the terminal portion.

4. A plow as set forth in claim 2 wherein said intermediate portions each consists of a concave upwardly curving part leading from the central portion and a convex upwardly and outwardly curving part leading from the upper end of the concave part into the terminal portion and wherein said terminal portions are each relatively long and straight and has said attaching means joined thereto at the outer end thereof.

GEORGE WASHINGTON BRAXTON.